United States Patent
Vasku

[15] 3,696,358
[45] Oct. 3, 1972

[54] CONTROL CIRCUITRY FOR AN ADVERTISING DISPLAY

[72] Inventor: Louis J. Vasku, 711 N. Bellevue Blvd., Bellevue, Nebr. 68005

[22] Filed: April 21, 1971

[21] Appl. No.: 136,798

[52] U.S. Cl. .................340/221, 40/28.1, 40/28.3, 40/53 A, 179/100.1 C, 179/100.2 S
[51] Int. Cl. .............................................G08b 3/10
[58] Field of Search....340/221; 40/53 R, 53 A, 53 B, 40/28.1, 28.3; 179/100.1 C, 100.2 S

[56] References Cited

UNITED STATES PATENTS

| | | | |
|---|---|---|---|
| 2,152,296 | 3/1939 | Weis et al. | 340/221 X |
| 2,501,048 | 3/1950 | Haller | 340/221 X |
| 2,699,089 | 1/1955 | Jakobs et al. | 179/100.2 S X |
| 3,028,789 | 4/1962 | Wade | 179/100.2 S X |
| 3,359,665 | 12/1967 | Gerry | 40/28.1 |
| 3,583,617 | 6/1971 | Kosaka | 179/100.2 S |

*Primary Examiner*—David L. Trafton
*Attorney*—Henderson & Strom

[57] ABSTRACT

An electrical circuitry for coordinating the movement of a continuous and repetitive series of advertising display items with an audible program having therein a prerecorded commentary relative to the display items wherein a movable display apparatus is operably connected to an audible system through the electrical circuitry, and the audible system includes a magnetic tape having sensor tapes affixed thereto which coact with relays in the electrical circuit to coordinate the movement of the apparatus to the movement of the magnetic tape.

14 Claims, 4 Drawing Figures

PATENTED OCT 3 1972 3,696,358

INVENTOR.
LOUIS J. VASKU
BY
Henderson & Strom
ATTORNEYS

INVENTOR.
LOUIS J. VASKU
BY
ATTORNEYS

CONTROL CIRCUITRY FOR AN ADVERTISING DISPLAY

BACKGROUND OF THE INVENTION

The marketing of merchandise is so highly competitive that it is necessary for retailers and wholesalers alike to constantly change and modernize their advertising methods in order for them to sell their products to the discriminating customer. The public has become conditioned to respond only to attractive advertising displays, which must first of all attract their attention, and secondly appeal favorably to their senses. Various methods and gimmicks devised with these purposes in mind include the movement of a part or all of a display, as well as the combination of sound with a visual display. A further development combines a sound program with a moving display and, still further, a sound program commenting on various stages in the movement of the visual display, the latter of which requires a means of coordinating the visual and audio programs. Should they get out of phase, the combination is entirely useless.

There have been many methods and devices to combine movement and sound in an advertising display, most of which are capable of desynchronization. Those which insure constant synchronization are of a more permanent and lasting nature and do not provide the flexibility required in the advertising field. There has not been a simple method of coordinating audio and visual displays wherein either or both may be modified as desired.

SUMMARY OF THE INVENTION

This invention relates generally to an advertising display apparatus and more particularly to an electrical control circuit for the synchronization of a mechanical display with a recorded commentary relative thereto.

It employs the use of a sensing tape placed strategically on a prerecorded magnetic tape, the sensing tape adapted to close a pair of relays and activate the mechanical system to move a visual display. A pair of micro-switches act to stop the movement of the display and to deactivate the relay circuits respectively, the switches being operated by a strategically located cam on the rotatable display table.

The display may be readily modified by changing the items resting on the rotatable table, and the commentary may be correspondingly modified by simply erasing the program recorded thereon and recording another program to correspond to the modified display. A single person with very little training may easily change the display, and the apparatus will operate automatically with no tending required whatsoever.

It is therefore an object of this invention to provide a new and improved advertising display apparatus having movement and corresponding audio commentary.

Another object of this invention is the provision for an electrical circuitry adapted to coordinate the movement of a visual advertising display with an audio commentary relative thereto.

Yet another object of this invention is the provision in an advertising display apparatus for an electrical control circuitry adapted to continuously drive an endless pre-recorded tape having a section of sensing tape strategically secured thereto.

Still another object of this invention is the provision in an electrical circuitry adapted to control the movement of a display apparatus, for temporarily stopping the movement upon the display reaching a predetermined position.

A further object of this invention is the provision in an electrical control circuitry adapted to continuously drive an endless prerecorded tape having a sensing device strategically secured thereon, for initiating the movement of an advertising display upon the device's reaching a predetermined position.

Yet another object of this invention is the provision in an electrically controlled advertising apparatus having synchronized audio and visual displays for readily and simply modifying the relative programs thereon.

A still further object of this invention is the provision for an electrical control circuitry adapted to co-ordinate the movement of a rotatable display with a sound recorded commentary relative thereto, which is economical to manufacture, simple in construction and extremely functional in use.

These objects and other features and advantages become more readily apparent upon reference to the following description when taken in conjunction with the appended drawings.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
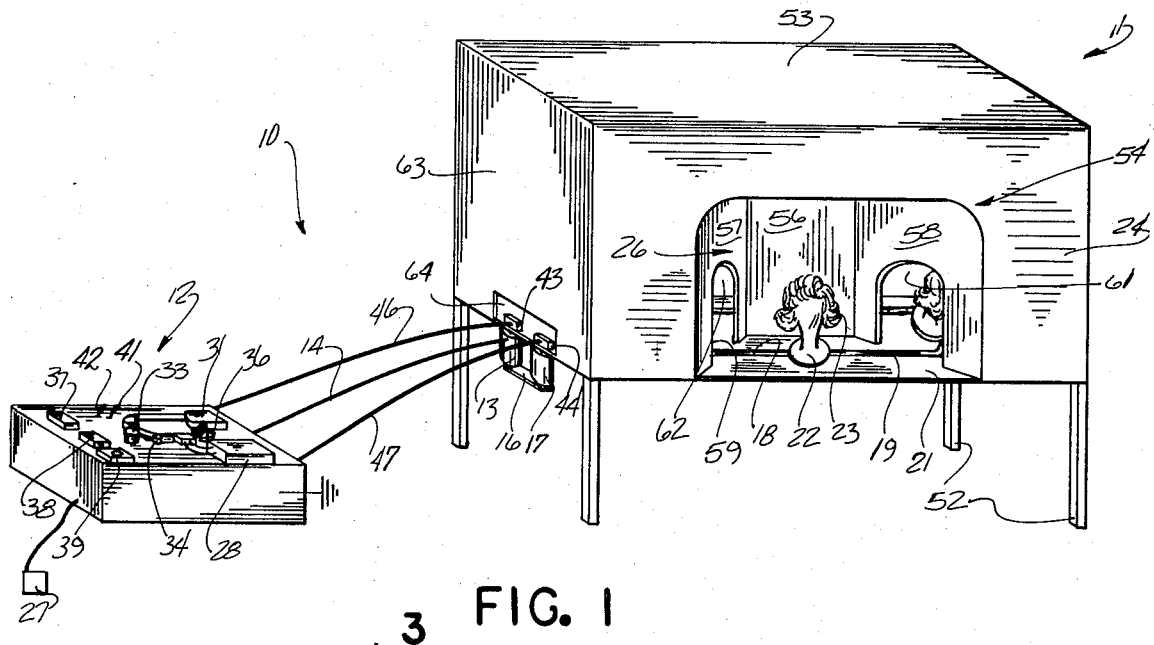
FIG. 1 shows a perspective view of the advertising display apparatus.
Figure 3:
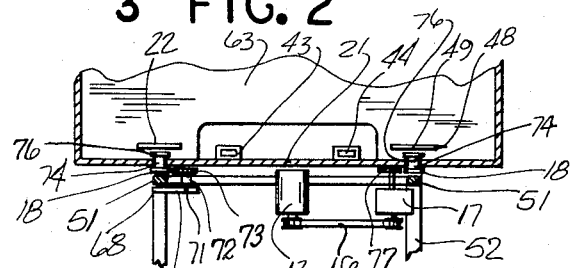
FIG. 3 shows a sectional view of the display table as seen along lines 3—3 of FIG. 2.

Referring to the drawings and in particular to FIG. 1, the advertising display apparatus is indicated generally at 10 and comprises a table display unit 11 and an electrically connected control unit 12. An electric motor 13, secured to the underside of the display unit, is electrically connected by a lead 14 to the control unit 12 and mechanically connected by a pulley 16 to a gear box 17, which is operably engaged with an endless chain 18 (FIG. 3). The chain 18 is contiguous with an annular slot 19 formed in the horizontal floor 21. A plurality of pallets 22 each having thereon a display item 23, such as a wig or the like, are secured by means hereinafter described, to the chain 18, and are rotated on a horizontal plane. The pallets are spaced in a manner wherein there is at all times one pallet on the stage 24 (FIG. 1), the other pallets being concealed by the display unit front wall 24 and the stage back wall 26.

Figure 4:
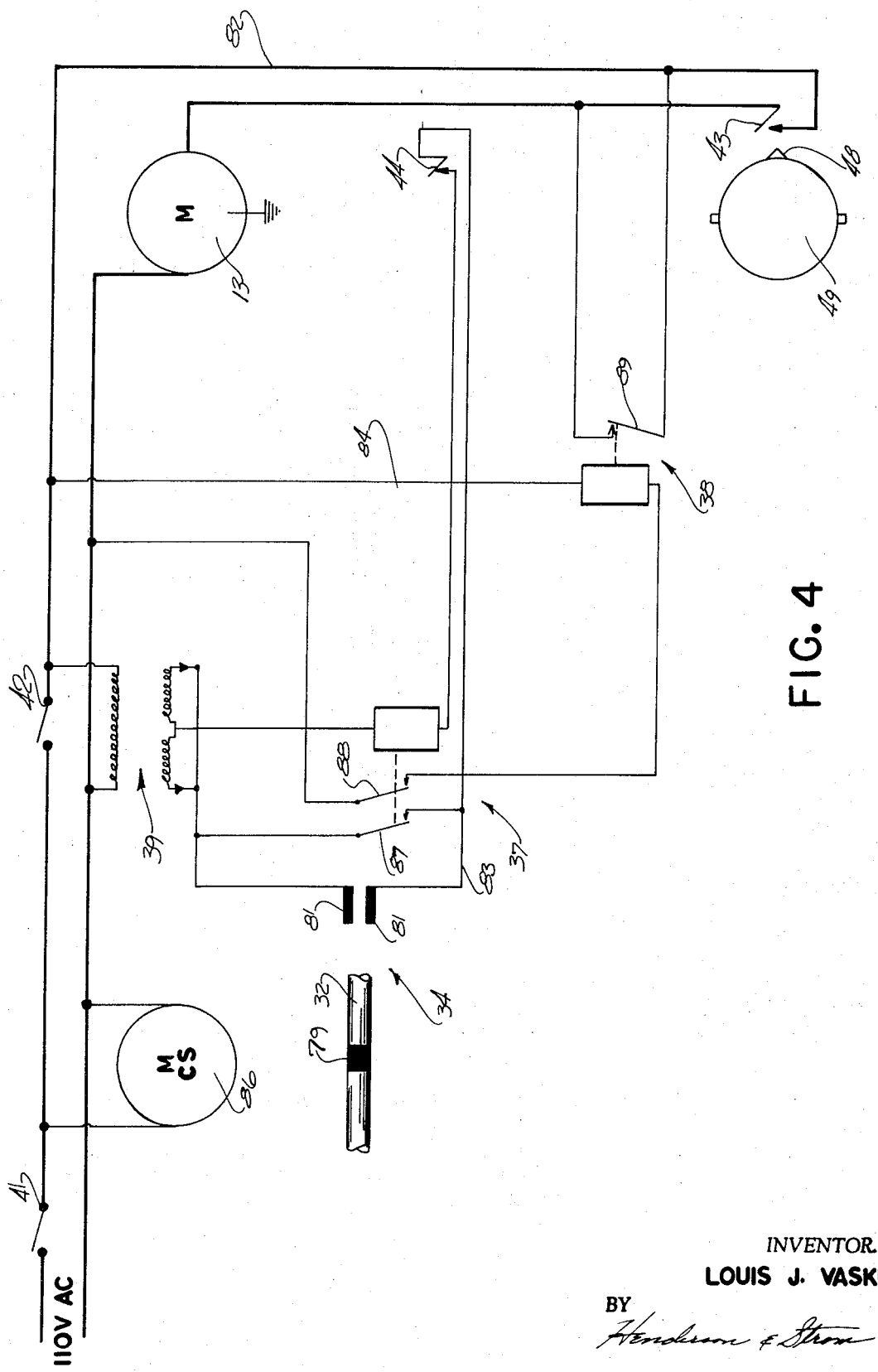
FIG. 4 is a schematic view of the electrical control circuitry for the advertising display apparatus.

The control unit 12 (FIG. 1) regulates the movement of the pallets 22 through the motor 13 and produces an audio commentary relative thereto. The control unit 12 is connected to a 110-volt power source 27 and includes in its circuitry hereinafter described a standard tape recorder unit 28, a head module 29 having a record playback head therein electrically connected to the tape recorder, a tape cartridge 31, an endless magnetic tape 32 rotatably disposed in the cartridge and having a loop extending outwardly therefrom, a pair of tape pinch rollers 33 adapted to frictionally engage the tape 32 and continually rotate it in the cartridge 31, a sensor post 34 having a pair of spaced contacts thereon and adapted to close an electrical circuit when a conductor connects the two contacts, an erase head 36 engageable with the tape 32, a pair of relays 37 and 38, a transformer 39, and a pair of toggle switches 41 and 42. Also included in the electrical circuitry is a pair of normally-closed micro-switches 43 and 44 (FIG. 1) connected to the control unit 12 by leads 46 and 47 respectively. The micro-switches are strategically secured to the display unit floor 21 and are adapted to temporarily open when contacted by a cam 48 (FIGS. 3 and 4) extending from a particular pallet 49.

Figure 2:
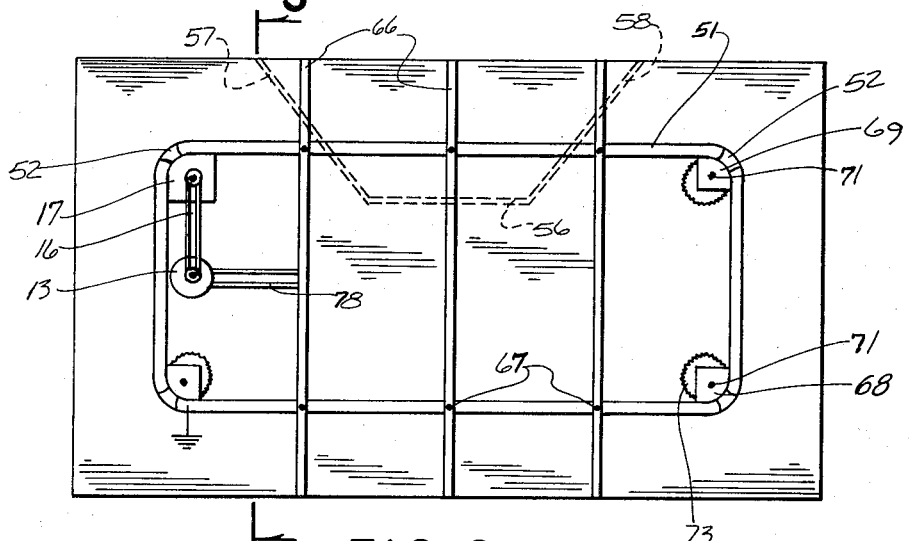
FIG. 2 shows a bottom view of the display table portion of the apparatus.

Directing closer attention to the display unit 11 (FIGS. 1, 2 and 3) we see a substantially rectangular, horizontally disposed frame 51 having four support legs 52 extending downwardly therefrom. Secured to the upper side of the frame 51 is the display unit floor 21 extending outwardly from the frame 51 and having upwardly extending walls secured thereto at its edges. A top cover 53 completes the box-like structure. The front wall 24 has an opening 54 formed therein, the opening being substantially centrally disposed with respect to the length of the wall, and extending from the lower edge to a point near the upper edge of the front wall 24. The stage back wall 26 extends vertically between the floor 21 and the top 53, and comprises a central section 56 and two oblique sections 57 and 58 (FIGS. 1 and 2), the central secton 56 being substantially parallel to the front wall 24, and the oblique sections 57 and 58 extending from either of its side edges to the side edges of the opening 54. The oblique sections 57 and 58 have openings 59 and 61 formed therein extending upwardly from their lower edges, which allow the pallets 22 to pass therethrough as they move along the path of the annular slot 19. A curtain 62 or the like may be suspended from the top of one or both of the openings to conceal that portion of the display unit behind the stage back wall 26.

The left side wall 63 (FIG. 1) has an opening 64 formed therein at its lower edge allowing leads 46 and 47 to pass therethrough to connect to the micro-switches 43 and 44 respectively. The normally closed micro-switches 43 and 44 are secured to the floor 21 (FIGS. 1 and 3) near the annular slot 19 and are adapted to open by engagement with a particular pallet cam 48 as previously described.

Referring to the underside of the display unit floor 21 (FIGS. 2 and 3), the floor 21 is secured to the frame 51 by three transverse supports 66, the supports 66 being fastened to the frame by bolts 67. At the corners of the frame, excluding that corner in which the gear box 17 is disposed, is secured a plate 63 (FIGS. 2 and 3) extending horizontally inwardly and having a vertical hole 69 formed therethrough. A rotatable shaft 71 is disposed in the hole, extending upwardly therefrom and having disposed thereon an annular spacer element 73 contiguous with the upper surface of the plate 68. The height of the spacer element 72 is substantially equal to the vertical thickness of the frame 51. Secured to the upper end of the shaft 71 is a rotatable sprocket 73 adapted to engage the endless chain 18, the chain 18 following the path of the annular slot 19 and slidably resting on the upper surface of the frame 51. Rigidly secured to the chain 18 is a plurality of spaced risers 74 extending upwardly through the annular slot 19 and adapted to slidably move along the length of the slot 19. At the upper end of each riser is a connector plate 76 rigidly secured to the riser in a substantially horizontal plane, the upper surface having secured thereto one of the pallets 22 for supporting the display items 23.

In the fourth corner of the frame 51 (FIGS. 2 and 3) an output gear 77 of the gearbox 17 operably engages the chain 18 on its inner side. The gear box 17 is secured to the frame underside, and is mechanically connected to the electric motor 13 by a pulley 16, the motor 13 being secured to the transverse support 66 by brackets 78.

Describing further the components of the control unit 12 (FIG. 1) the tape recorder 28 is of the standard type having an amplifier included therein to facilitate the playback function. The head module, connected by electrical leads to the recorder unit 28 has both a record head and a playback head to be selected by the operator. The erase head 36 is rotatably secured to the unit 12 in a position contiguous with the tape path wherein it may be easily pivoted to an erase position, or alternately to a position free of the tape 32. The tape cartridge 31 has an endless magnetic tape 32 rotatably secured therein, wherein the tape may be continuously rotated in the same direction thereby allowing the same program to be repeatedly passed through the playback head. The tape 32 is of a predetermined length, wherein the playing of a complete cycle takes a slightly greater length of time than does the movement of the display items 23 through a complete cycle around the annular slot 19. Strategically secured to the surface of the magnetic tape 32 is a section of sensor tape 79 (FIG. 4) adapted to bridge the contacts 81 (FIG. 4) of the sensor post 34 (FIG. 1). The sensor tape 79 is placed substantially at a point on the magnetic tape 32 wherein the commentary on the display items begins.

Referring to the circuitry (FIG. 4), it comprises a main circuit 82, a pilot circuit 83 and a master control circuit 84. The main circuit 82 is connected to a 110-volt AC power source and includes a first toggle switch 41; a constant speed motor 86 connected in parallel and adapted to drive the tape 32 by rotating the pinch rollers 33; a second toggle switch 42; the electric motor 13; and the normally-closed micro-switch 43. Closing the first toggle switch 41 activates the constant speed motor 86 and moves the tape 32 to allow for recording, erasing or playing a program on the tape 32. The second toggle switch 42 activates the electric motor 13 which moves the display unit (FIG. 1) until the cam pallet 49 arrives at a position wherein the cam 48 engages the first micro-switch 43 and causes it to open, thereby opening the circuit and causing the electric motor 13 and hence the movement of the display items 23 to cease. The pilot circuit 83 is then employed to cause the motor 13 to resume operation.

The pilot circuit 83 comprises the center tap transformer 39 connected in parallel to the main circuit 82 between the second toggle switch 42 and the electric drive motor 13, the transformer 39 adapted to transform the current to 6-volt DC current; the sensor post 34, frictionally engaged with the tape 32 and adapted to complete the circuit when the section of sensor tape 79 bridges the contacts 81; a second normally-closed micro-switch 44, placed near the path of the moving cam pallet 49, and adapted to open upon engagement with the cam 48; and the double-pole single-throw sensitive pilot relay 37. A third relay switch 87, operated by the relay 37 is normally open, and is connected in parallel with the sensor post 34, and the second relay switch 88 is connected in the master control circuit 84.

The master control circuit 84 is connected in parallel with the main circuit 82, between the transformer 39 and the electric motor 13, and comprises the second relay switch adapted to be closed by operation of the second relay; and a first relay 38. A first relay switch 89, connected in parallel to the main circuit 82 between the motor 13 and the micro-switch 43, is normally open and is closed by operation of the first relay 38.

In operation the toggle switches 41 and 42 are closed, thus activating both motors 13 and 86, the motor 13 causing the display items 23 to move and the motor 86 causing the tape 32 to pass through the playback head of the head module 29 and a prerecorded commentary to be audibly presented. The cam pallet 49, upon reaching a predetermined position, opens the first micro-switch 43 and causes the movement of the motor 13 and hence the display items 23 to cease, while the motor 86, and hence the tape 32 continue to operate. The portion of tape being played at that time has recorded thereon some music or the like to attract attention of possible observers. The strategically mounted sensor tape 79 soon reaches the sensor post 34, thereby completing the pilot circuit 83, thus causing the second relay to operate and the second 88 and third 87 relay switches to close. The sensor post portion of the circuit immediately becomes inactive, the low voltage DC current passing through the switch 87; and the master control circuit becomes activated with a 110 volt alternating current. The first relay 38 is thus activated and causes the first relay switch 89 to close, thereby completing the main circuit 82 and causing the motor 13 to resume operation. The cam pallet 49 will then move from the first micro-switch 43 and allow it to close, but the current will continue to flow through the shorter path of the first relay switch 89. After a minimal movement of the cam pallet 49, the cam 48 engages the second micro-switch 44, causing it to open and eliminate the current to the second relay 37. Both switches 87 and 88 will then open and the pilot circuit 83 and master control circuit 84 will be deactivated, thus allowing the first relay 38 to release the switch 89 and cause it to open. The current in the main circuit will then pass through the first micro-switch 43 until the pallet 49 makes a complete cycle and again causes the micro-switch 43 to open and the process to be repeated. The operation will continue indefinitely with the display items rotating and the tapered program audibly commenting thereon, with a short pause after each cycle to insure that the two do not get out of phase.

I claim:

1. A control circuitry for coordinating the movement of a display with a sound recording, the circuitry comprising:
    a tape player operably driving a tape, said tape having secured thereto at a predetermined position, an activating means adaptable to complete an electrical circuit;
    a drive motor mechanically connected to a movable display, and electrically connected in series with a power source and a first relay switch;
    a normally-closed micro-switch connected in parallel with said first relay switch, and adaptable to open upon said movable display's reaching a predetermined position;
    a second relay switch connected in series with a first relay, said first relay adapted to close said first relay switch upon the passing of current through said relay;
    a third relay switch connected in series with a second relay, said second relay adapted to close said second and third relay switches upon the passing of current through said relay;
    a switch connected in parallel with said third relay switch and adaptable to close upon the passing of said activating means therethrough; wherein, the drive motor, and hence the movable display, ceases to operate when said first micro-switch is opened, and resumes operation when the first relay switch is closed, said first relay switch being closed by the following progressive occurrences:
    a. said activating means on the tape passes through said switch and causes current to flow through said second relay;
    b. said second and third relay switches are closed by operation of said second relay;
    c. said first relay is activated, thereby causing said first relay switch to close.

2. A control circuitry as defined in claim 1 and including a second microswitch connected in series with said second relay, said microswitch being normally closed and adaptable to open upon said movable display's reaching a predetermined position, thereby opening said second and third relay switches and hence said first relay switch.

3. A control circuitry as defined in claim 1 wherein said first and second micro-switches are opened by engagement with a cam secured to said movable display.

4. A control circuitry as defined in claim 1 wherein said display is rotatable and adaptable to move continuously in the same direction.

5. A control circuitry as defined in claim 1 wherein said tape is continuous and repetitive.

6. A control circuitry as defined in claim 1 wherein said activating means comprises a section of sensor tape adapted to pass and bridge the space between two contact points of a contact switch.

7. A control circuitry as defined in claim 1 wherein the current passing through said second relay circuit is a low voltage direct current.

8. A control circuitry as defined in claim 7 wherein said circuitry includes a transformer and rectifier electrically connected to a power source.

9. A control circuitry as defined in claim 7 wherein only one power source is used, with said tape player, said transformer, and said first relay circuit, electrically connected thereto in parallel.

10. A control circuitry as defined in claim 1 wherein said tape player includes an eraser head and a record head and is adaptable to have various programs recorded thereon.

11. A control circuitry as defined in claim 1 wherein said movable display has at least one portion thereof isolated in coordination with the playing of said tape.

12. A control circuitry as defined in claim 1 wherein said movable display comprises a plurality of pallets secured to a movable linkage, said pallets adaptable to have various items removably placed thereon.

13. A control circuitry as defined in claim 12 wherein said pallets are spaced on said linkage at predetermined positions.

14. A control circuitry as defined in claim 1 wherein said movable display is disposed in a horizontal plane.

* * * * *